US010612602B2

(12) United States Patent
Halm et al.

(10) Patent No.: US 10,612,602 B2
(45) Date of Patent: Apr. 7, 2020

(54) SPRING ACTUABLE FRICTION CLUTCH

(71) Applicant: Dr. Ing. h.c. F. Porsche Aktiengesellschaft, Stuttgart (DE)

(72) Inventors: Martin Halm, Pforzheim (DE); Arne Krüger, Karlsruhe (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 137 days.

(21) Appl. No.: 15/889,627

(22) Filed: Feb. 6, 2018

(65) Prior Publication Data

US 2018/0223915 A1 Aug. 9, 2018

(30) Foreign Application Priority Data

Feb. 8, 2017 (DE) .......................... 10 2017 102 394

(51) Int. Cl.
*F16D 13/58* (2006.01)
*F16D 13/56* (2006.01)

(52) U.S. Cl.
CPC ........... *F16D 13/585* (2013.01); *F16D 13/56* (2013.01)

(58) Field of Classification Search
CPC ............................. F16D 13/585; F16D 13/56
USPC ...................................................... 192/89.23
See application file for complete search history.

(56) References Cited

U.S. PATENT DOCUMENTS

| 3,450,241 | A | * | 6/1969 | Syozo | ..................... F16D 13/71 192/70.18 |
| 4,195,719 | A | | 4/1980 | Martinez | |
| 4,846,326 | A | | 7/1989 | Tilton et al. | |
| 5,301,779 | A | * | 4/1994 | Nash | ..................... F16D 13/385 192/109 F |
| 5,960,921 | A | | 10/1999 | Hofmann et al. | |
| 5,975,268 | A | | 11/1999 | Weidinger et al. | |
| 6,409,002 | B1 | * | 6/2002 | Orlamunder | .......... F16D 13/385 192/70.17 |
| 9,388,843 | B2 | * | 7/2016 | Stojkovic | .............. F16B 37/067 |
| 9,605,706 | B2 | * | 3/2017 | Hwang | .................. F16B 37/062 |
| 2010/0206681 | A1 | | 8/2010 | Komori et al. | |
| 2015/0322992 | A1 | | 11/2015 | Hwang et al. | |
| 2015/0369274 | A1 | | 12/2015 | Stojkovic et al. | |

(Continued)

FOREIGN PATENT DOCUMENTS

| BR | 9803481 A | 10/1999 |
| CN | 101535671 A | 9/2009 |
| CN | 203453325 U | 2/2014 |

(Continued)

OTHER PUBLICATIONS

Chinese Office Action for Chinese Application No. 201810096367.6, dated Dec. 31, 2019 with translation, 12 pages.

*Primary Examiner* — David R Morris
(74) *Attorney, Agent, or Firm* — RatnerPrestia

(57) ABSTRACT

A spring-actuable friction clutch, having a disk carrier and a cup spring which is connected to the latter via screwed connections. Threaded sleeves are arranged fixedly on the disk carrier. The cup spring has openings which are penetrated by the threaded sleeves. A holding ring is arranged on that side of the cup spring which faces away from the disk carrier. Bolts penetrate passages of the holding ring and are screwed into the threaded sleeves. In a friction clutch of this type, particularly simple mounting and fastening of the cup spring on the disk carrier is ensured.

13 Claims, 4 Drawing Sheets

(56) References Cited

U.S. PATENT DOCUMENTS

2016/0121937 A1  5/2016  Forsyth

FOREIGN PATENT DOCUMENTS

| | | |
|---|---|---|
| CN | 105745464 A | 7/2016 |
| DE | 2149317 A1 | 4/1973 |
| DE | 2815803 A1 | 2/1979 |
| DE | 3839718 A1 | 6/1989 |
| DE | 3916853 A1 | 5/1990 |
| DE | 19650462 A1 | 6/1998 |
| DE | 19808685 A1 | 9/1999 |
| DE | 10080929 B4 | 3/2011 |
| DE | 202015103134 U1 | 10/2015 |
| DE | 102015104152 A1 | 11/2015 |
| DE | 102015118460 A1 | 5/2016 |
| DE | 102015210020 A1 | 12/2016 |
| GB | 1352989 | 5/1974 |
| GB | 1506738 | 4/1978 |

* cited by examiner

SPRING ACTUABLE FRICTION CLUTCH

CROSS-REFERENCE TO RELATED APPLICATIONS

This application claims priority to German Patent Application No. DE 10 2017 102 394.1, filed Feb. 8, 2017, the contents of such application being incorporated by reference herein in their entirety.

FIELD OF THE INVENTION

The invention relates to a spring-actuable friction clutch, having a disk carrier and a cup spring which is connected to the latter via screwed connections.

BACKGROUND OF THE INVENTION

The attachment of a cup spring to a disk carrier takes place in known friction clutches predominantly via riveted connections or formed sheet metal elements. Friction clutches for cup spring actuating means are primarily known in dry single disk or multiple disk clutches. Wet-running friction clutches with cup actuation are used in motorcycle applications.

A spring-actuable friction clutch of the type mentioned at the outset is known from DE 38 39 718 A1, which is incorporated by reference herein. Said clutch has a disk carrier which is screwed to a cup spring. The cup spring is arranged obliquely and is held in said rest position by way of rings which are arranged in an offset manner. In said rest position, a pressure disk and disks of the clutch are held on one another in a frictionally locking manner. The cup spring is clamped in fixedly between the two rings. The one ring is configured in one piece with the disk carrier on its inner face, that is to say its side which faces the disks. The other ring is configured on a ring disk. The ring disk is fixed on the inner face of the disk carrier and spaced apart from the latter by way of pins and nuts. A spacer sleeve which defines the setpoint spacing between the rings is placed onto each pin. Each sleeve runs through a hole of sufficient size which is configured in the cup spring.

A spring-actuable friction clutch which is designed in this way is very complex structurally and the cup spring has to be mounted in a complicated manner in said friction clutch, since a multiplicity of individual parts have to be positioned with respect to one another and have to be connected to one another.

SUMMARY OF THE INVENTION

Described herein is a spring-actuable friction clutch of the type mentioned at the outset in such a way that structurally particularly simple mounting and fastening of the cup spring on the disk carrier is ensured.

It is provided in the friction clutch according to aspects of the invention that threaded sleeves are arranged fixedly on the disk carrier, and the disk carrier has openings, the threaded sleeves penetrating said openings, and a holding ring is arranged on that side of the cup spring which faces away from the disk carrier, bolts penetrating passages of the holding ring and being screwed into the threaded sleeves.

It is therefore provided in the friction clutch according to aspects of the invention that the threaded sleeves are arranged fixedly on the disk carrier. They therefore do not have to be handled during mounting of the cup spring, but rather it is merely necessary to plug the cup spring in the region of its openings onto the threaded sleeves and subsequently to position the holding ring and to plug the bolts through the passages of the holding ring and screw them into the threaded sleeves.

The entire mounting of the cup spring can therefore take place from outside the disk carrier, that is to say, exclusively on that side of the disk carrier which faces away from the disk or the disks of the friction clutch.

For the fixed arrangement of the threaded sleeves on the disk carrier, it is provided, in particular, that the disk carrier has recesses for receiving the threaded sleeves. Said recesses are, in particular, those which penetrate the disk carrier. Therefore, the threaded sleeves can be positioned simply with regard to the disk carrier when they are plugged into the recesses.

In particular, the fixed arrangement of the threaded sleeves in the disk carrier takes place by virtue of the fact that the respective threaded sleeve is connected to the disks carrier by means of a riveted connection. In this way, the connection of the respective threaded sleeve and the disk carrier can be brought about rapidly, simply and reliably. The disk spring is preferably braced between the disk carrier and the holding ring.

The disk spring is preferably arranged in a braced manner between two rings. Here, one ring (outer ring) of the rings is arranged between the holding ring and the cup spring, and the other ring (inner ring) of the rings is arranged between the cup spring and the disk carrier. In this way, this results in particularly simple and secure mounting of the cup spring between the two rings, which mounting makes a pivoting movement of the cup spring possible during actuation of the friction clutch, that is to say during the action on the cup spring by means of a pressure disk.

As an alternative, the cup spring is braced between the holding ring and one ring, the ring being arranged between the cup spring and the disk carrier, said ring therefore being the inner ring. The holding ring has, in particular, a circumferential projection which is directed toward the cup spring or a plurality of projections which are directed toward the cup spring, the respective projection making contact with the cup spring in the region of its end which faces the cup spring. Therefore, the ring (outer ring) which is arranged between the holding ring and the cup spring in the other variant is replaced by the modified holding ring.

If the friction clutch is closed, the spring force is supported, depending on the variant, via the bolts, the holding ring and the outer ring or via the bolts and the modified holding ring. No introduction of force takes place via the inner ring into the disk carrier. If the friction clutch is open, the release force, that is to say the force of a pressure disk, is supported via the cup spring on the inner ring and forwards the force into the disk carrier. Here, the bolts, the holding ring and the outer ring or the bolts and the modified holding ring do not absorb any forces.

The respective ring is, in particular, a wire ring. It has a hardness which is such that so the stressing forces can be transmitted between the holding ring and the disk carrier without a dimensional change of the ring.

It is considered to be preferred if the rings and/or the respective projection of the holding ring is/are arranged radially outside the arrangement of the threaded sleeves. If an action is therefore carried out on the disk spring via a pressure disk in a region which is arranged radially within the holding ring, the cup spring can pivot with regard to the rings supporting the pressure disk at a very great radial spacing from the region of action of said pressure disk.

In particular, the respective passage of the holding ring has a circular cross section. All the passages of the holding ring preferably have the same circular cross section. It is provided according to one preferred development that the diameter of the respective passage is dimensioned in such a way that said passage serves for gap-free receiving of the threaded sleeve which penetrates said passage. This is understood to mean an arrangement, in which receiving with only a small amount of play is generated on in account of the gap-free receiving. This achieves a situation where the holding ring is positioned in a defined manner with respect to the bolts.

With regard to the respective opening of the cup spring, it is considered to be preferred if said opening is of radially inward open and radially outward closed configuration, in relation to the cup spring, all the openings having the same cross section, in particular. According to one development of the respective opening of the cup spring, it is considered to be preferred if the openings are arranged in such a way that the respective opening serves radially on the outside for receiving the threaded sleeve which penetrates said opening with a gap. Said receiving with a gap makes a certain amount of tilting of the cup spring possible during its actuation with regard to the threaded sleeves. The openings are preferably arranged in such a way that the respective opening serves tangentially for gap-free receiving of the threaded sleeve which penetrates said opening.

The respective bolt is designed, in particular, in such a way that it has a bolt head and a bolt shank with a threaded portion. Here, the bolt head makes contact with the holding ring.

The designations which are used in the above text, namely openings of the cup spring, passages of the holding ring and recesses which penetrate the disk carrier, are not to be understood such that they have a different technical meaning. Said terms have been selected, in particular, in order to make a linguistic distinction.

BRIEF DESCRIPTION OF THE DRAWINGS

Further features of the invention result from the subclaims, the appended drawing and the description of the exemplary embodiment which is illustrated in the drawing, without being restricted hereto.

In the drawing.

DETAILED DESCRIPTION OF THE INVENTION

Figure 1:
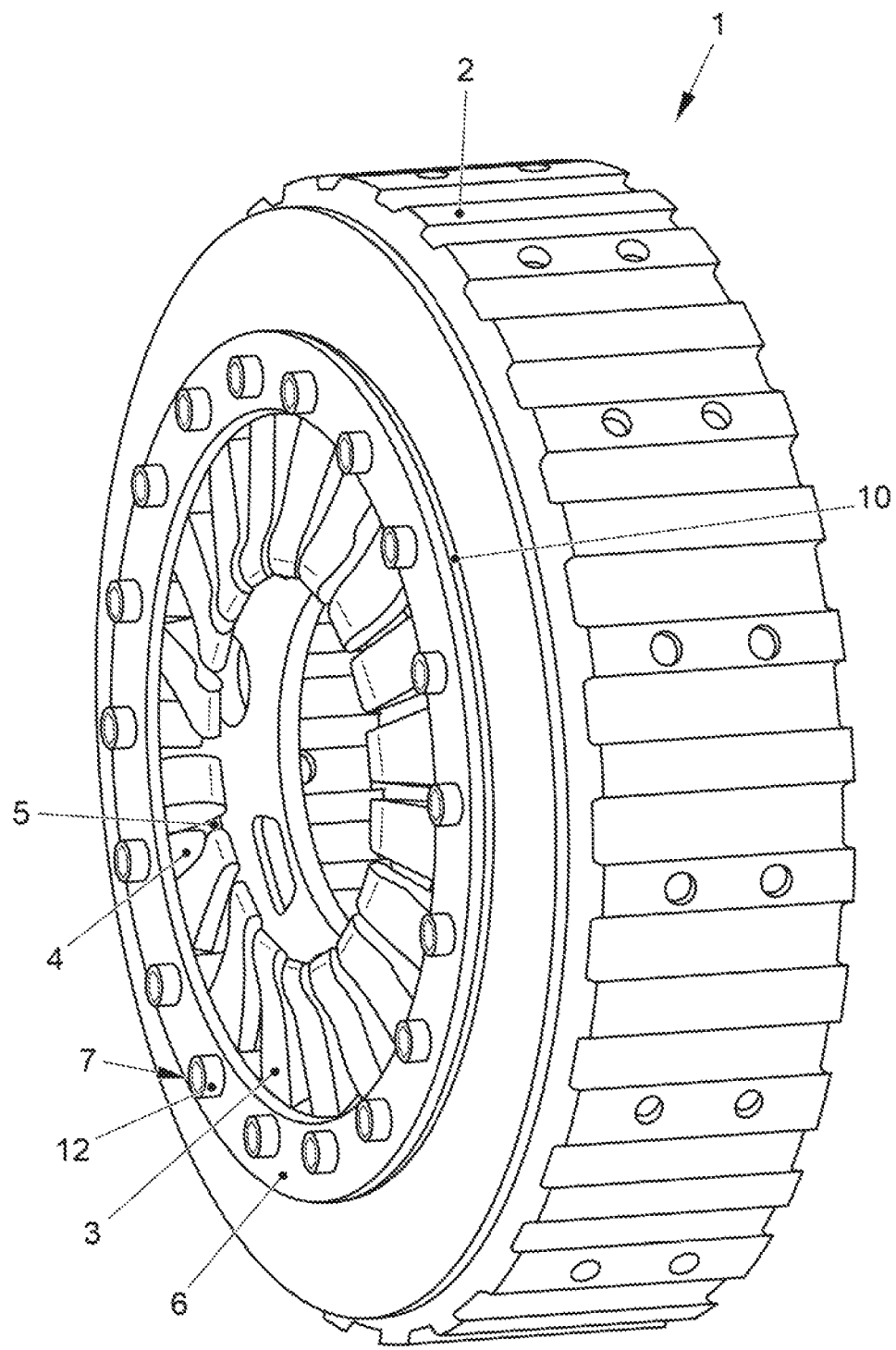
FIG. 1 shows, in relation to a spring-actuable friction clutch, an arrangement of a disk carrier and a cup spring which is connected to the latter via screwed connections, illustrated in a three-dimensional view.
Figure 2:
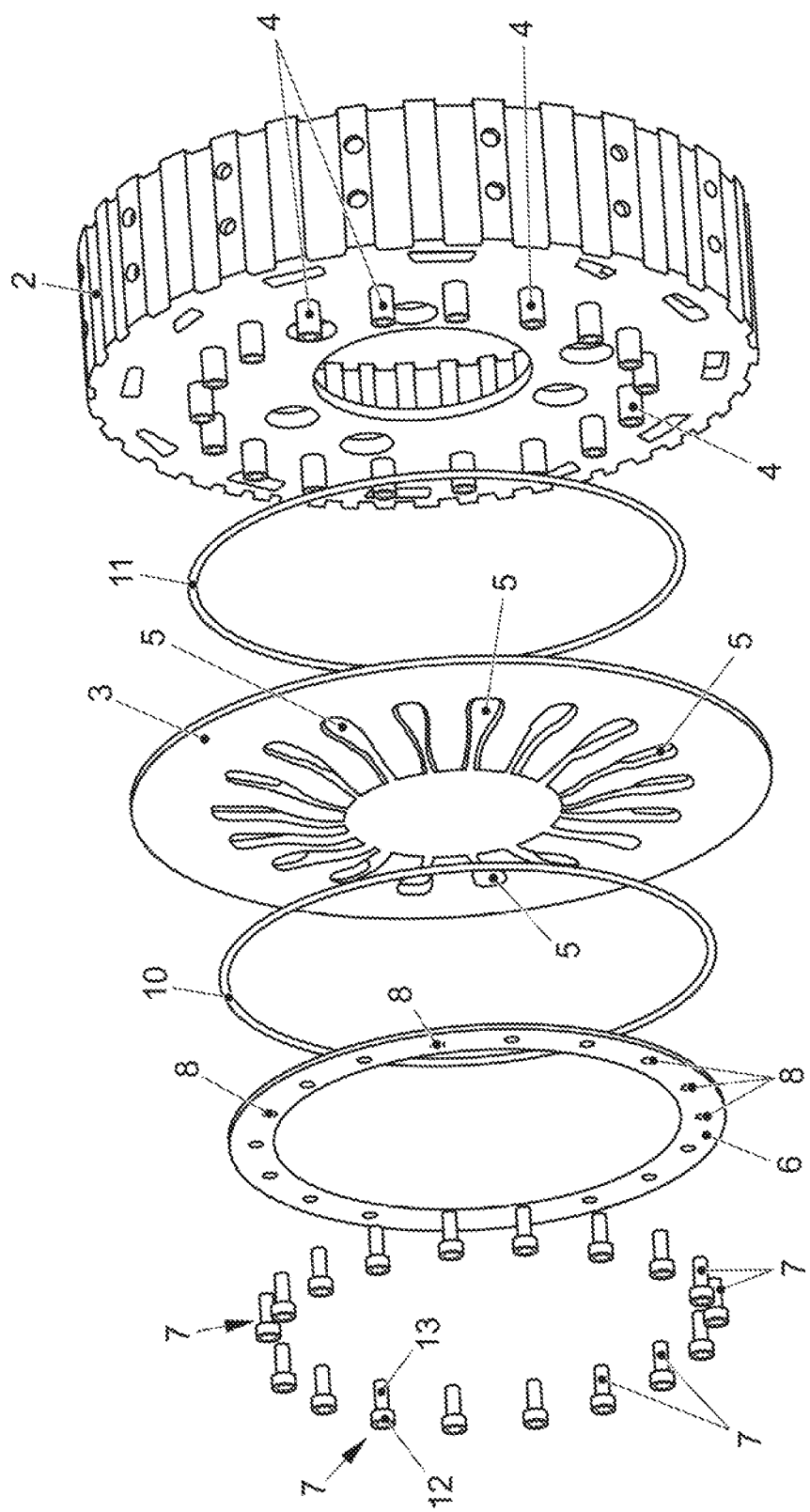
FIG. 2 shows the arrangement according to FIG. 1 in a three-dimensional exploded illustration.
Figure 3:
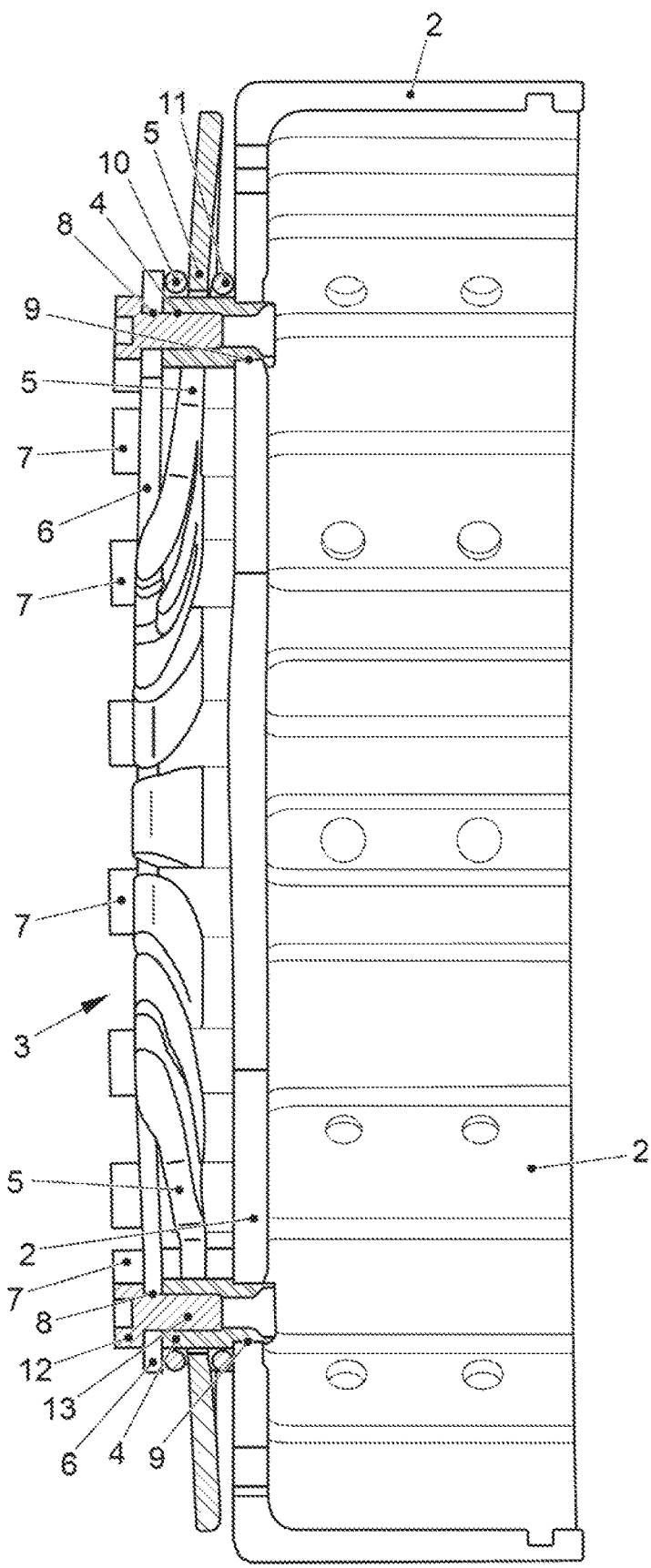
FIG. 3 shows a sectional illustration of the arrangement according to FIG. 1.
Figure 4:
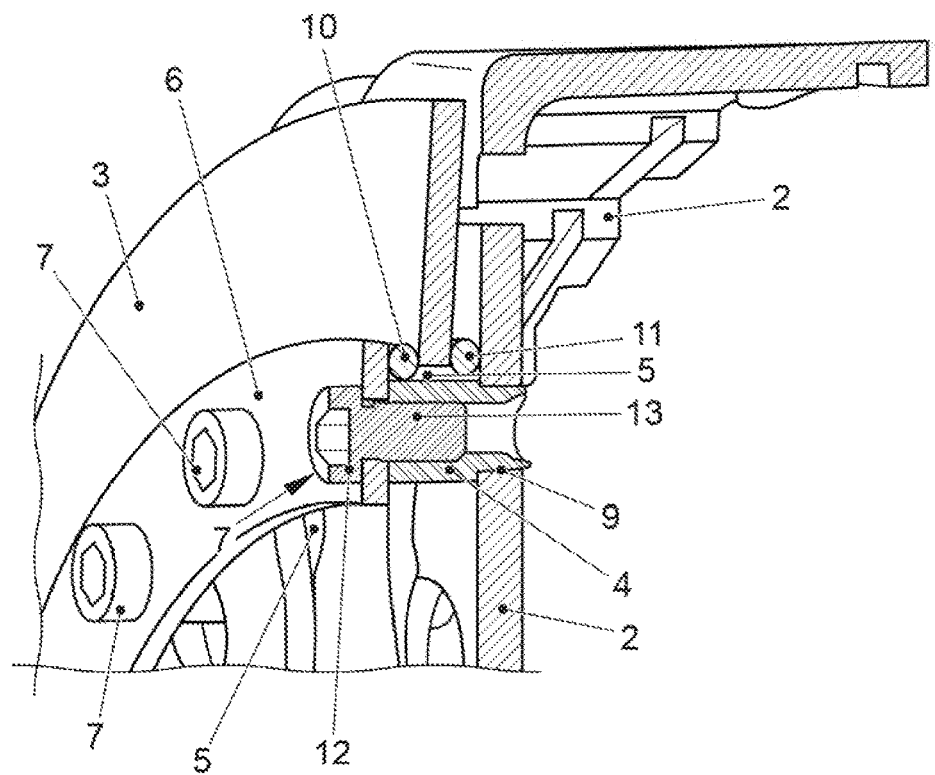
FIG. 4 shows a detailed view of the arrangement for a screwing region, in a three-dimensional illustration, depicted in sectioned form.
Figure 5:
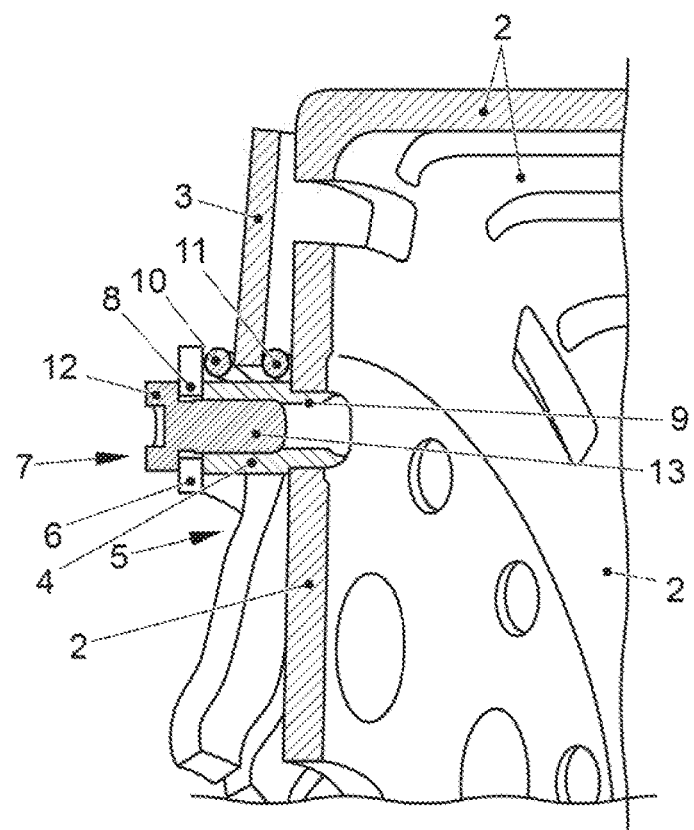
FIG. 5 shows an illustration according to FIG. 4, as viewed from another viewing direction.

A partially illustrated spring-actuable friction clutch 1 has a disk carrier 2 and a cup spring 3 which is connected to the latter via screwed connections, it being possible for said cup spring 3 to be actuated externally by means of a pressure piece (not illustrated).

Threaded sleeves 4 are arranged fixedly on the disk carrier 2, and the cup spring 3 has openings 5. The threaded sleeves 4 penetrate the openings 5. A holding ring 6 is arranged on that side of the cup spring 3 which faces away from the disk carrier 2. Bolts 7 of the screwed connections penetrate passages 8 of the holding ring 6 and are screwed into the threaded sleeves 4.

The disk carrier 2 is the clutch housing of the friction clutch.

The disk carrier 2 has recesses 9 for receiving the threaded sleeves 4. Said recesses 9 penetrate the disk carrier 2. In concrete terms, eighteen recesses 9 are provided for receiving eighteen threaded sleeves 4, said threaded sleeves 4 therefore serving to receive eighteen bolts 7. Accordingly, the cup spring 3 has eighteen openings 5, and the holding ring has eighteen passages 8.

The respective threaded sleeve 4 is plugged through the associated recess 9 of the disk carrier 2 and is riveted to the latter. The respective threaded sleeve 4 therefore projects to the outside beyond the disk carrier 2, this being understood to be that side of the disk carrier 2 which faces away from one or more disks of the friction clutch.

The cup spring 3 is arranged in a braced manner between two rings 10, 11. Said rings are wire rings. The one ring 10 is arranged between the holding ring 6 and the cup spring 3, and the other ring 11 is arranged between the cup spring 3 and the disk carrier 2. The rings 10, 11 are positioned radially outside the arrangement of the threaded sleeves 4. The respective ring 10 or 11 has a constant circular cross section. The two rings 10, 11 are of identical design.

The respective passage 8 of the holding ring 6 has a circular cross section. All the passages 8 have the same circular cross section. Here, the diameter of the respective passage 8 is dimensioned in such a way that said passage 8 serves for gap-free receiving of a bolt shank 13 of the bolt 7 which penetrates said passage 8. The holding ring 6 is therefore positioned only with a small amount of play with regard to the bolts.

The respective opening 5 of the cup spring 3 is of radially inwardly open and radially outwardly closed configuration in relation to the cup spring 3. In particular, all the openings 5 have the same cross section. The openings 5 are arranged in such a way that the respective opening 5 serves radially on the outside for receiving the threaded sleeves which penetrate said opening 5 with a gap. The respective threaded sleeve 5 is positioned in the region of the radially outer, closed end of the opening 5. Said above-described receiving with a gap makes slight pivoting of the cup spring 2 possible during its actuation. Furthermore, the openings 5 are arranged in such a way that the respective opening 5 serves tangentially for gap-free receiving of the threaded sleeve 4 which penetrates said opening 5. This design is to be seen against the background that no tangential play is required between the disk carrier 3 and the threaded sleeves 4 which are assigned to it.

The respective bolt 7 has a bolt head 12 and the bolt shank 13 with a threaded portion. The bolt head 12 makes contact with the holding ring 6.

In order to mount the arrangement of the disk carrier 2 and the cup spring 3, it is merely necessary to plug the ring 11 onto the arrangement of the disk carrier 2 and the threaded sleeves 4 which are riveted to the latter, to subsequently plug the cup spring 3 onto the threaded sleeves 4, to subsequently plug the ring 10 onto the cup spring 3, to subsequently place the holding ring 6 on top and to screw it by means of the bolts 7 which are plugged through the passages 8 of the holding ring 6 and are screwed into the threaded sleeves 4.

The actuation of the cup spring 3 takes place in its radially inner region by way of the action by means of an axially displaceable pressure piece, in relation to the axial direction of the friction clutch 1.

A simple modification of the above-described exemplary embodiment can be provided if the holding ring 6 and the ring 10 are designed in one piece, in such a way that the holding ring 6 is not of flat configuration, but rather has a circumferential projection which extends in the direction of the cup spring 3, is given the function of the ring 10, and makes contact with the cup spring 3.

What is claimed is:

1. A spring-actuable friction clutch comprising:
   a disk carrier and a cup spring which is connected to the disk carrier via screwed connections, wherein the disk carrier includes a hollow region for accommodating a pressure disk,
   threaded sleeves arranged fixedly on the disk carrier and extending from a side of the disk carrier that is opposite the hollow region,
   the cup spring having openings that are penetrated by the threaded sleeves,
   a flat holding ring arranged on a side of the cup spring which faces away from the disk carrier, the flat holding ring and the cup spring being positioned on the side of the disk carrier that is opposite the hollow region, and
   bolts penetrating passages of the flat holding ring and being fastened to the threaded sleeve,
   wherein the cup spring is braced between the disk carrier and the flat holding ring,
   wherein the cup spring is arranged in a braced manner between two rings, one ring of the two rings being arranged between the flat holding ring and the cup spring, and the other ring of the two rings being arranged between the cup spring and the disk carrier, and
   wherein the rings have a hardness such that stressing forces transmitted between the flat holding ring and the disk carrier do not produce a dimensional change of the rings.

2. The friction clutch as claimed in claim 1, wherein the disk carrier has recesses for receiving the threaded sleeves, the recesses penetrating the disk carrier.

3. The friction clutch as claimed in claim 1, wherein the respective threaded sleeve is connected to the disk carrier by a riveted connection.

4. The friction clutch as claimed in claim 1, wherein the holding ring is fixed between the threaded sleeves and the bolts in an axial direction of the respective threaded sleeve.

5. The friction clutch as claimed in claim 1, wherein the cup spring is braced between the holding ring and said other ring, said other ring being arranged between the cup spring and the disk carrier.

6. The friction clutch as claimed in claim 5, wherein each ring is a wire ring.

7. The friction clutch as claimed in claim 5 wherein either the rings or the respective projection are arranged radially outside the threaded sleeves.

8. The friction clutch as claimed in claim 1, wherein each passage of the holding ring has a circular cross section, all the passages having the same circular cross section.

9. The friction clutch as claimed in claim 8, wherein a diameter of each passage is dimensioned such that said passage serves for gap-free receiving of the bolt which penetrates said passage.

10. The friction clutch as claimed in claim 1, wherein each opening of the cup spring is of radially inward open and radially outward closed configuration, in relation to the cup spring, and all the openings having the same cross section.

11. The friction clutch as claimed in claim 10, wherein the openings are arranged such that each opening serves radially on the outside for receiving the threaded sleeve which penetrates said opening with a gap.

12. The friction clutch as claimed in claim 10, wherein the openings are arranged such that each opening serves tangentially for gap-free receiving of the threaded sleeve which penetrates said opening.

13. The friction clutch as claimed in claim 1, wherein each bolt has a bolt head and a bolt shank with a threaded portion, the bolt head making contact with the holding ring.

* * * * *